May 30, 1950  M. A. ROBLEE  2,509,529
PUSHER CONVEYER
Filed April 25, 1947  2 Sheets-Sheet 1

MILTON A. ROBLEE
INVENTOR.

BY George A Evans
ATTORNEY

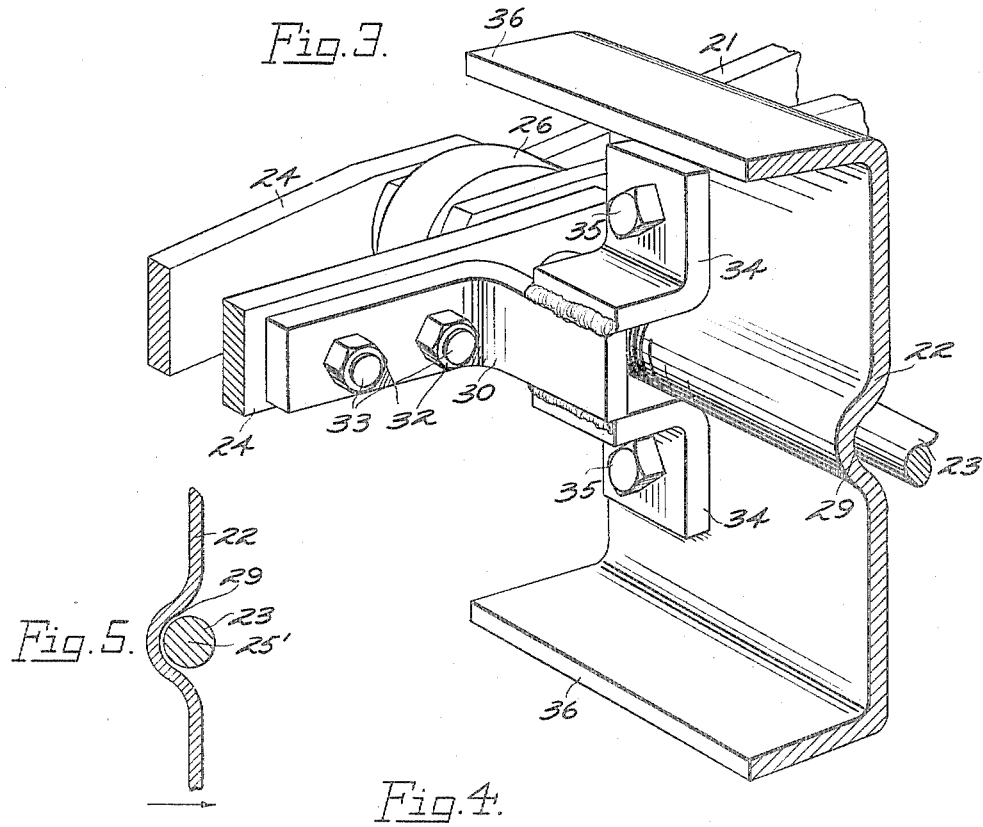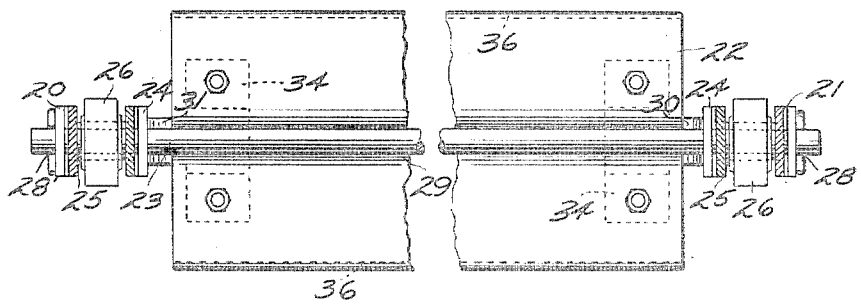

Patented May 30, 1950

2,509,529

UNITED STATES PATENT OFFICE 2,509,529

PUSHER CONVEYER

Milton A. Roblee, Milwaukee, Wis., assignor to Chain Belt Company, Milwaukee, Wis., a corporation of Wisconsin Application April 25, 1947, Serial No. 743,770

5 Claims. (Cl. 198—172)

This invention relates to improvements in conveyers and is particularly directed to conveyers having double strand chain belts which have a flight attachment interposed between the strands of chain while being connected to them.

In the past such conveyer chains were manufactured of malleableized cast iron links and have been widely used in such industries as the sugar industry where they were utilized to convey bagasse which is the fibrous product left after the juices are squeezed from the sugar cane.

Because absolute pitches could not be maintained in the manufacture of cast chain links, the flights extending between the strands were pivotally attached or swiveled to the side bars of the chain links to accommodate the stretch and unequal pitch of the chain. However, in the use of such chains, it has been found that the load on each strand of chain is concentrated on one line of side bars, and, unless some means of strengthening the chain was found to offset the eccentric load, the factor of safety had to be doubled. This resulted in undue expense and bulk.

Another objection to the use of swiveled flights has been the fact that such an arrangement aggravates the aforesaid eccentric loading in the operation of the conveyer, for the matted bagasse builds up to further cause the flight to slew over and increase the load on one side of the strand. This feature has caused excessive chain wear in the past with the resultant necessity of frequent replacement and consequent expense.

It has been found that rigid rods extending through both strands and forming the pintle of particular links, offset these unequal loads and distribute them equally on all four lines of the side bars. It has been further found that such a use was best applied to steel chains as the pitch of the links is capable of being extremely accurate. However, when used as a bagasse or corn stalk conveyer having the conventional pivoted flights aforesaid, it has been found that the through rods themselves were bent and distorted by the weight of the built-up, matted bagasse. This again caused eccentric loading and rapid wear of the conveyer chain.

It is the chief object of this invention to provide a chain conveyer which distributes the load more evenly on the side bars of the chain strands, and which will last longer in service; however, other objects and advantages will become apparent from the following description and claims.

In the drawings:

Fig. 3 is a broken away perspective view of the improved chain and flight.

Fig. 4 is a front view of the chain and flight in section taken on line 4—4 of Fig. 1.

Fig. 5 is a sectional view of the flight and through rod taken along the lines 5—5 of Fig. 2.

Figure 1:
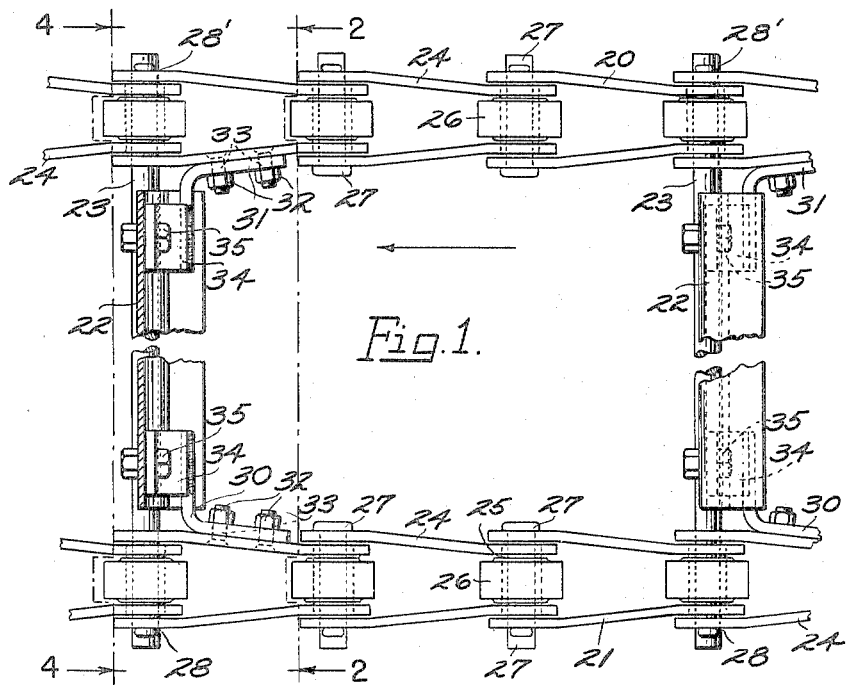
Fig. 1 is a plan view partly in section of a double strand conveyer chain showing the improved flight and chain.
Figure 2:
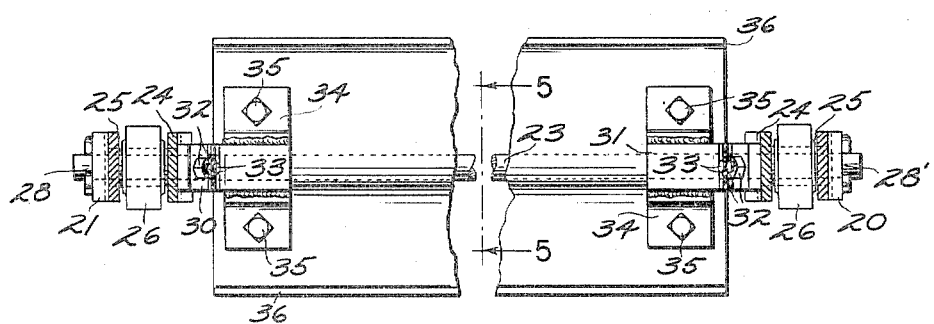
Fig. 2 is a rear view partly in section along the lines 2—2 of Fig. 1.

The embodiment chosen to best illustrate the invention as is seen in Fig. 1 and the following figures, generally comprises two strands of steel roller chain 20 and 21, the cross flights 22 and steel rods 23 connecting both strands together. The strands of steel roller chain 20 and 21 comprise links each having offset side bars 24 with apertures at each end. The apertures at the narrow end are connected by a bushing 25, shown in dotted lines, while the apertures at the other end are connected by pintles 27, which are arranged to extend through the bushing of an adjacent link. Rollers 26 are journaled on the bushings 25. The heads of the pintles 27 are shown as being disposed on the inside of the chain strand to prevent excessive wear thereof.

The conveyor shown usually is arranged to run on tracks which are set in troughs. The trough is usually on the order of as much as six feet in width. It can be appreciated that eccentric loading of such a conveyer chain would produce severe bending effects. Also, the normal bunching of the matted bagasse as it is conveyed can subject the conveyer chain to very heavy and unequal loads.

The improved conveyor chain further comprises the rigid through rods 23 extending from strand to strand and arranged so that it forms the pintle portion of the links as at 28 and 28′, thus permitting stabilization of the chain pitch. The spacing of the through rods may vary in different applications. Here they are shown with every third pitch of chain. The through rods alone have proved ineffectual without the further feature of this invention, i. e., the flights 22 disposed so as to form a conveying member as well as a protective device for the through rods. As shown in Fig. 5 the flight 22 is arranged contiguous to the rearward side of the through rod 23. In the instant embodiment which is best illustrated in Fig. 5, the arrangement is such that the conveying face of the flight has its center line extending slightly over the center line of the through rod 25′. This is accomplished by arranging the concave portions 29 of the flight in the manner shown so that the rod 23 is nested in the flight. As the conveyer is loaded, the flight and rod cooperate to form a rigid structure, the concave portion of the flight further serving to strengthen the flight itself.

The flight is attached to the inner side of the link side bars 24 of the respective chain strands by means of the L-shaped brackets 30 and 31 connected thereto by means of nuts and bolts 32 and 33. Attached to the inwardly bent portion of each of said brackets 30 are a pair of L-shaped brackets 34, which are secured to the back of the flight 22 by bolts 35. The brackets 34 straddle the concave portions 29 of the flight and their rearward edges are preferably overlapped and welded to the upper and lower edges of the brackets 30 as illustrated in Fig. 3. The flight is further strengthened by means of integral flanges 36 formed of the metal of the flight; these flanges are arranged to further strengthen the flight when said conveyer is in operation. The present arrangement of through rod and flight has the further advantage that the bagasse cannot easily catch on the through rod, or between the through rod and the flight, and hence the conveyer will discharge cleanly at its discharge point.

Since the flights are detachable from the chain side bars and may thus be removed the same as the through rods, the conveyers can be shipped in disassembled condition, requiring less space, and reassembled at their point of use. Similarly, replacements may be easily made should they be required.

Numerous variations will occur to one skilled in the art while reading the foregoing description and while studying the drawings. Hence, the invention is to be limited only by the clear import of the following claims.

I claim:

1. In a conveyer chain having two spaced parallel strands of offset side bar, roller links, rod-like members connecting some of said offset spaced links arranged to form the pintle of said links, brackets detachably secured to the inner side bars of said links having engaging faces transverse to the line of travel of the chains, a transverse flight arranged to engage said surfaces and means for securing the flight and faces together, said flight having a medial concave portion arranged to partly encompass said rodlike member whereby said rodlike member is supported while the chain is conveying material, the aforesaid faces of the supporting bracket being disposed on either side of the concave medial portion of the flight.

2. In a conveyer chain having two spaced parallel strands of sidebar links, rod-like members connecting some of said spaced links, said rod-like members extending through apertures in the links so connected whereby to form the pintles of said links, a roller journalled on that portion of the rod-like members between the sidebars of said links, the periphery of said roller providing a surface whereby rolling contact is made with the structure supporting the chain, said chain strands having a flight securely attached to the links adjacent said rod-like members, said flight being arranged to be immediately contiguous the rearward side of said rod-like member whereby the rod-like member is supported against deflection during operation of the conveyer and the space between the parallel strands of links is maintained substantially constant.

3. In a conveyer chain having two spaced parallel strands of sidebar links, rod-like members connecting some of said spaced links, said rod-like members extending through apertures in the links so connected whereby to form the pintles of said links, a roller journalled on that portion of the rod-like members between the sidebars of said links, the periphery of said roller providing a surface whereby rolling contact is made with the structure supporting the chain, said chain strands having a flight securely attached to the links adjacent each of said rod-like members, said flight having a forward concave portion partially encompassing the rod-like member whereby the flight is strengthened against deflection and the rod-like member is supported during operation of the conveyer.

4. In a conveyer chain having two spaced parallel strands of sidebar links, rod-like members connecting some of said spaced links, said rod-like members extending through apertures in the links so connected whereby to form the pintles of said links, a roller journalled on that portion of the rod-like members between the sidebars of said links, the periphery of said roller providing a surface whereby rolling contact is made with the structure supporting the chain, said chain strands having a flight securely attached to the links adjacent said rod-like members, said flight member having a medial concave portion disposed in embracing relationship with said rod-like member whereby the flight is strengthened against deflection and forms a support limiting deflection of the rod-like member during operation of the conveyer.

5. In a conveyer chain having two spaced parallel strands of sidebar links, rod-like members connecting some of said spaced links, said rod-like members extending through apertures in the links so connected whereby to form the pintles of said links, a roller journalled on that portion of the rod-like members between the sidebars of said links, the periphery of said roller providing a surface whereby rolling contact is made with the structure supporting the chain, bracket means attached to the inside sidebars of said links, a transverse flight attached to said bracket means, said flight having a medially arranged surface concavely disposed about said rod-like member whereby said flight and said rod-like member may support each other during periods of extreme loading, flat transverse portions formed of the material of the flight at the upper and lower edges thereof and lying in planes angular with respect to the plane of the flight whereby the flight is strengthened against deflection during operation of the conveyer.

MILTON A. ROBLEE.

REFERENCES CITED

The following references are of record in the file of this patent:

UNITED STATES PATENTS

| Number | Name | Date |
| --- | --- | --- |
| 1,083,558 | Powell | Jan. 6, 1914 |
| 1,707,088 | Lynch | Mar. 26, 1929 |